US008949209B2

(12) United States Patent
Khin et al.

(10) Patent No.: US 8,949,209 B2
(45) Date of Patent: Feb. 3, 2015

(54) METHOD AND SYSTEM FOR ANONYMIZING DATA DURING EXPORT

(75) Inventors: Gerald Khin, Frankenthal (DE); Mathias Prowald, Bexbach (DE)

(73) Assignee: Software AG, Darmstadt (DE)

(*) Notice: Subject to any disclaimer, the term of this patent is extended or adjusted under 35 U.S.C. 154(b) by 0 days.

(21) Appl. No.: 13/479,775

(22) Filed: May 24, 2012

(65) Prior Publication Data
US 2013/0282679 A1 Oct. 24, 2013

(30) Foreign Application Priority Data

Apr. 18, 2012 (EP) .................................... 12164569

(51) Int. Cl.
G06F 17/30 (2006.01)

(52) U.S. Cl.
USPC .......................................................... 707/698

(58) Field of Classification Search
USPC .................... 707/698, 736; 709/201; 713/193
See application file for complete search history.

(56) References Cited

U.S. PATENT DOCUMENTS

| 6,253,203 B1* | 6/2001 | O'Flaherty et al. .................... 1/1 |
| 8,024,339 B2* | 9/2011 | Barker et al. ................. 707/736 |
| 8,468,244 B2* | 6/2013 | Redlich et al. ................ 709/225 |
| 2001/0011247 A1* | 8/2001 | O'Flaherty et al. ............. 705/39 |
| 2002/0073138 A1* | 6/2002 | Gilbert et al. ................ 709/201 |
| 2004/0199768 A1* | 10/2004 | Nail ............................. 713/169 |
| 2004/0210763 A1* | 10/2004 | Jonas ........................... 713/193 |
| 2006/0059148 A1* | 3/2006 | Dunki et al. ...................... 707/6 |
| 2006/0059149 A1* | 3/2006 | Dunki et al. ...................... 707/6 |
| 2006/0059189 A1* | 3/2006 | Dunki et al. .................. 707/102 |
| 2007/0136237 A1* | 6/2007 | Barker et al. ..................... 707/2 |
| 2008/0114991 A1* | 5/2008 | Jonas ........................... 713/193 |
| 2009/0254572 A1* | 10/2009 | Redlich et al. ................. 707/10 |
| 2011/0060905 A1 | 3/2011 | Stack et al. |
| 2011/0078143 A1* | 3/2011 | Aggarwal .................... 707/737 |
| 2012/0030165 A1* | 2/2012 | Guirguis et al. ............. 707/607 |
| 2012/0036135 A1* | 2/2012 | Fu et al. ...................... 707/748 |
| 2012/0259877 A1* | 10/2012 | Raghunathan et al. ....... 707/757 |

FOREIGN PATENT DOCUMENTS

| WO | WO 2004/045123 | 5/2004 |
| WO | WO 2010/028395 | 3/2010 |

OTHER PUBLICATIONS

Bernice S. Elger et al., "Strategies for Health Data Exchange for Secondary, Cross-Institutional Clinical Research," Computer Methods and Programs in Biomedicine, vol. 99, No. 3, pp. 230-251, Sep. 2010.

Search Report issued in corresponding European Application No. 12164569.1 on Aug. 2, 2012.

* cited by examiner

Primary Examiner — Jean M Corrielus
(74) Attorney, Agent, or Firm — Nixon & Vanderhye P.C.

(57) ABSTRACT

The present invention refers to a computer-implemented method of anonymizing data of a database (2), wherein the method comprises the following steps:
a. exporting at least one data record (10) from the database (2), wherein the data record (10) has a structure and comprises content (100); and
b. anonymizing at least part of the content (100) to produce at least one anonymized data record (3);
c. wherein the anonymized data record (3) has the same structure than the data record (10) read from the database (2).

19 Claims, 8 Drawing Sheets

Fig. 3b

Figure 1:
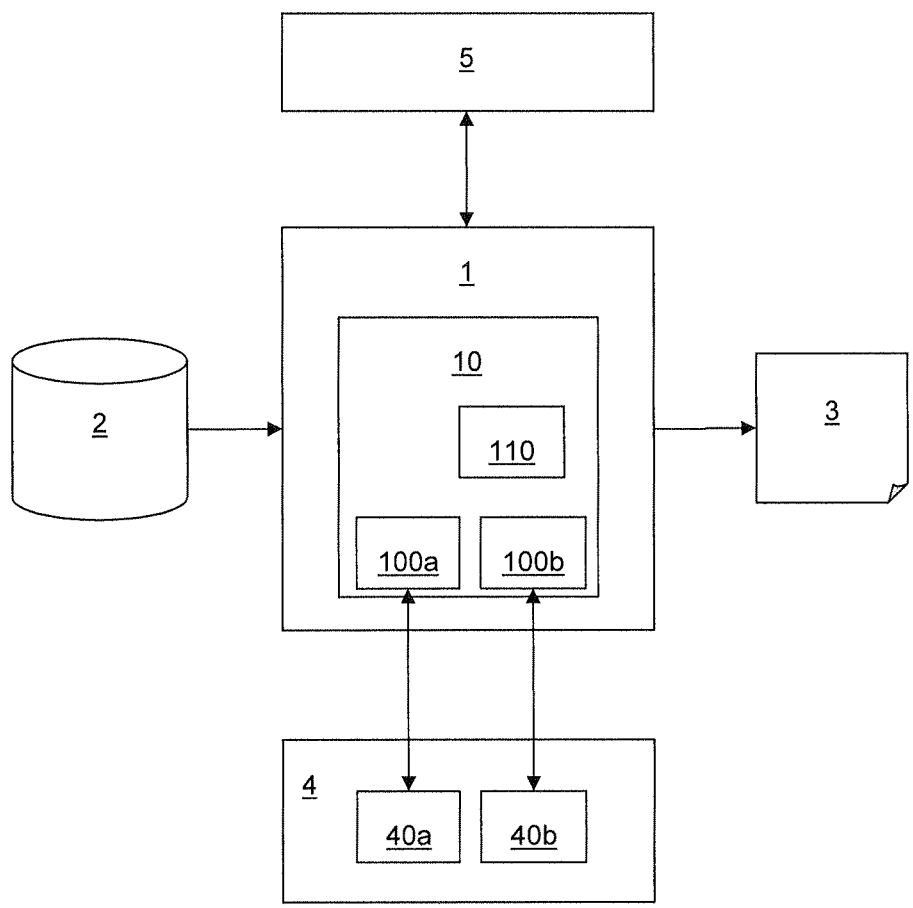

| Attribute name | Sourcing risk 2(English - Alternative language) |
|---|---|
| Name | Sourcing risk 2 |
| Identifier | |
| Description/Definition | Sourcing requests can get lost. Purchase orders are not entered in the system. Inaccurate, incomplete information. |
| Author | |
| Type | Risk |
| Time of generation | Sep 10, 2005 4:23:58 PM |
| Creator | system |
| Last change | Mar 22, 2010 3:45:30 PM |
| Last user | system |

Fig. 3c

| Attribute name | Sourcing control 2(English - Alternative language) |
|---|---|
| Control ID | K - B 2 |
| Control objective | Adequate and proper input of purchase orders and their timely processing. |
| Key control | ✓ Key control |
| Control activity | Check of consecutive, system-side numbering of the purchase orders. |
| Control frequency | Weekly |
| Effect of control | Preventive |

Fig. 3d

| Attribute name | Sourcing test definition 2-01(English - Alternative language) |
|---|---|
| Test activity | Check compliance with accounting principles. Review the list of long-term open positions. |
| Test size | 3% of all purchase requisitions |
| Test frequency | Monthly |
| Time limit for execution in days | 20 |
| Start date of test definition | Nov 18, 2005 |
| End date of test definition | Dec 31, 2010 |
| Length of control period | Month |
| Offset in days | 18 |
| Follow-up allowed | ☑ Follow-up allowed |

Fig. 3e

| Attribute name | Sourcing(English - Alternative language) |
|---|---|
| Name | Sourcing |
| Identifier | |
| Author | |
| Type | Organizational unit |
| Time of generation | Oct 24, 2005 6:46:47 PM |
| Creator | system |
| Last change | Mar 22, 2010 3:45:19 PM |
| Last user | system |

Fig. 6a

```
public class Customer {
    @Size(max = 100)
    private String name;

@Email
    private String email;

@Size(min=10000, max=99999)
    private int zipCode;

@CreditCardNumber
    private String creditCardNo;
``` transformation rules
as annotated Java code

Fig. 6b

```
<transformation-rules>
    <object-type NAME="Customer">
        <field NAME="Name" TYPE="String" SIZE_MAX="100"/>
        <field NAME="Email" TYPE="String"
            TRANSFORMER="Email"/>
        <field NAME="ZipCode" TYPE="int" SIZE_MIN="10000"
            SIZE_MAX="99999"/>
        <field NAME="CreditCardNo" TYPE="String"
            TRANSFORMER="CreditCardNumber"/>
``` transformation rules
encoded as XML

Fig. 7

```
Transformer tf = ...;
Object originalObject = ...;

Object transformedObject = tf.transform(originalObject);
```

Applying transformation rules to an object

METHOD AND SYSTEM FOR ANONYMIZING DATA DURING EXPORT

This application claims priority to EP 12 164 569.1 filed 18 Apr. 2012, the entire contents of each of which are hereby incorporated by reference.

1. TECHNICAL FIELD

The present invention relates to a method and system for anonymizing data of a database, in particular during exporting the data from the database.

2. BACKGROUND AND SUMMARY

Nowadays, typical software products employed by individuals or enterprises are very complex and oftentimes bugs or performance issues are encountered only after the software has been used for a certain time. Once encountered, the user will report the bug to the provider of the software product, e.g. to the provider's support department, in order for the bug to be fixed.

In order for the software provider to reproduce the encountered bug, it is often necessary that the software provider operates on the actual data which was processed by the software product when the bug occurred, because the issue to be reproduced highly depends on the structure and validity of the user's data running through the buggy software product. However, the users are often not willing to send their data to the software provider's support department, if the data is confidential and must not be seen by the software provider.

In the prior art, certain products are known which might be used in this context. For example, Oracle's so-called "Data-Pump" enables a user to plug-in a self-written function into Oracle's database system to modify the data (Data Pump Data Remapping). Another example is the product ARTS business architect of applicant which provides a report functionality (internal java script functions based on a public API) to make the data of a user's ARTS installation anonymous. As a further example, the user might export his data from his software installation, for example as an XML file, which could then be transformed with the help of XSLT transformations. While the above approaches could be used by the user to obscure the actual data before it is sent to the software provider, i.e. to anonymized the confidential data, these approaches are not very flexible to changing requirements and also involve a lot of effort, since the way how the data should be modified must in some cases be hard-coded by the user in a self-written function and heavily relies on the user's database schema.

Furthermore, US 2011/0060905 A1 discloses systems and methods for providing anonymized user profile data. In this disclosure, confidential user data, such as names and addresses, are anonymized in order to be usable for personalized advertising. While the anonymized data might be helpful for tailoring advertisements to the user, the anonymized data is obscured in such a way that it is not usable in the context of the present invention, since the anonymized data does not allow to reproduce bugs occurred in a user's software product.

It is therefore the technical problem underlying the present invention to provide an approach for anonymizing data in such a manner that confidential parts thereof remain securely protected, while the anonymized data can still be investigated in a meaningful manner, thereby at least partly overcoming the above explained disadvantages of the prior art.

This problem is according to one aspect of the invention solved by a computer-implemented method of anonymizing data of a database. In the embodiment of claim 1, the method comprises the following steps:

a. exporting at least one data record from the database, wherein the data record has a structure and comprises content; and
b. anonymizing at least part of the content to produce at least one anonymized data record;
c. wherein the anonymized data record has the same structure than the data record read from the database.

Within the scope of the present invention, the term "anonymizing" is to be understood in the sense of converting a given piece of data into a form which does not allow to derive the original content of the data.

Accordingly, the above embodiment defines an approach for anonymizing data in a particularly intelligent manner, namely such that the data, yet anonymized, can still be investigated and analysed in a meaningful manner. This is because the method preserves the structure of the original data while anonymizing the data content.

As s simple example, consider a data record in the database whose structure defines two data fields: name and address. The content of the name field is "John Doe" and the content of the address field is "Elm Street". The anonymizing process of the present invention produces an anonymized data record in which the name "John Doe" is anonymized e.g. to "ABC" and the address "Elm Street" is anonymized e.g. to XYZ. Nevertheless, the present invention preserves the structure of the original data record, i.e. it is still possible to identify that the anonymized data record comprises a name field and an address field. This way, the present invention departs from known approaches, such as disclosed in the above-cited US 2011/0060905 A1, in which a name/address tuple is anonymized into a single encrypted identifier, i.e. the structure of the original data is lost during the anonymizing process.

In one aspect of the present invention, the step of anonymizing is performed during the step of exporting, so that no confidential content is stored outside of the database during the exporting process. Accordingly, the anonymizing functionality is encapsulated within the export functionality, which has two advantages: firstly, the anonymizing algorithm cannot be changed or manipulated from the outside. Secondly, the confidential data does not leave the database in such a manner that it would be (persistently or temporarily) stored outside of the database.

Accordingly, this aspect provides a particular high degree of security and data confidentiality.

In another aspect of the invention, the step of anonymizing may comprise generating a random encryption key, anonymizing at least part of the content to produce at least one anonymized data record using the random encryption key, and deleting the random encryption key. Accordingly, The means for anonymizing the content (the encryption key) is exclusively generated for each particular run of the anonymizing process and destroyed immediately afterwards. This ensures that the anonymized data cannot be decrypted in order to derive the original data.

Moreover, the method may comprise the further step of selecting which part of the content is to be anonymized, wherein the step of anonymizing comprises anonymizing only the selected content. Accordingly, not all of the content of a given data record is necessarily anonymized, but the part to be anonymized may be selected (e.g. by a user). In particular if the data record comprises a mix of confidential and uncritical content, this aspect greatly increases the performance of the anonymizing process, since only the necessary minimum of content might be anonymized. This in turn saves processing resources of the underlying system executing the anonymizing process.

Preferably, the step of anonymizing is performed in a deterministic manner, so that the anonymizing of a given part of the content always results in the same anonymized content. This is an important characteristic of some embodiments of the present invention and ensures that relationships between the data fields of the data records are preserved during the anonymizing process, as will be explained in more detail in the detailed description. To achieve the above-described deterministic behavior, the step of anonymizing may be performed using a cryptographic hash function, preferably the Secure Hash Algorithm (SHA). Alternatively or additionally, the step of anonymizing may be performed using a random anonymizing process and using a cache to remember already created anonymized content, which will be explained in more detail further below.

According to yet another aspect of the invention, the content to be anonymized adheres to at least one data type and wherein the step of anonymizing preserves the validity of the anonymized content in accordance with the at least one data type. For example, if a data field of the original data record stores email addresses, it is ensured that also the anonymized data record, with the content of the email address being anonymized, still indicates that the anonymized content relates to an email address.

The step of anonymizing may be performed using one or more predefined transformation rules, which might be provided in the form of code annotations and/or in the form of a configuration file, in particular an XML file (see the detailed description below).

The above aspects of the present invention are particularly advantageous if the at least one data record comprises confidential data, wherein the corresponding anonymized data record is usable for being investigated while preserving the confidentiality of the confidential data. As will be explained in more detail further below, the concepts of the present invention may in this way be used e.g. for a software product provider to analyze and investigate bugs in the software product without being able to see the actual (confidential) data of the user.

The present invention also refers to a system for anonymizing data of a database, wherein the system comprises an exporter component, adapted for exporting at least one data record from the database, wherein the data record has a structure and comprises content, an anonymizer component, adapted for anonymizing at least part of the content to produce at least one anonymized data record, wherein the anonymized data record has the same structure than the data record read from the database. Further advantageous modifications of embodiments of the system of the invention are defined in further dependent claims. Lastly, the present invention might also be provided in the form of a computer program comprising instructions for implementing any of the methods disclosed herein.

3. SHORT DESCRIPTION OF THE DRAWINGS

Figure 2:
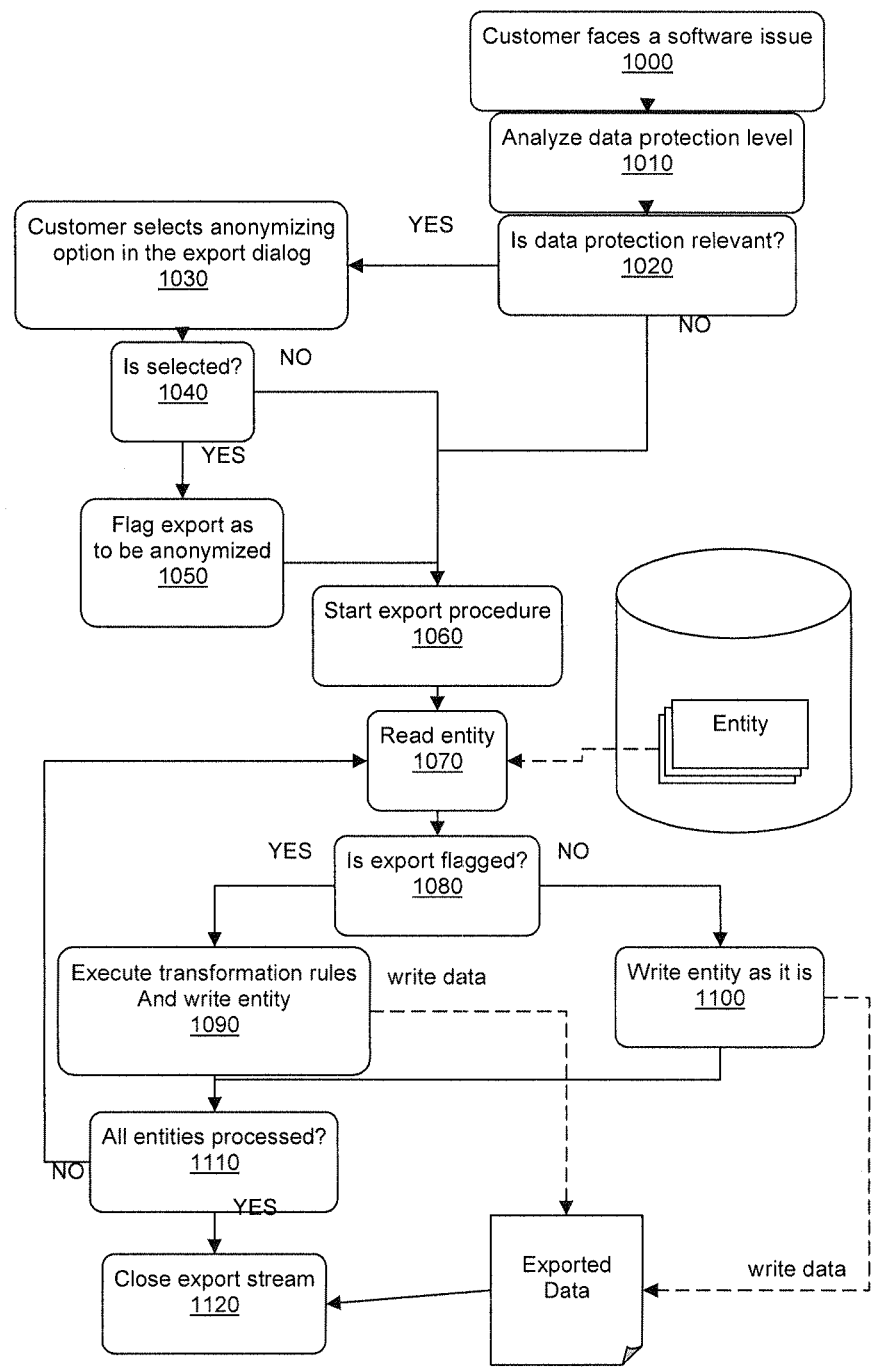
Figure 3A:
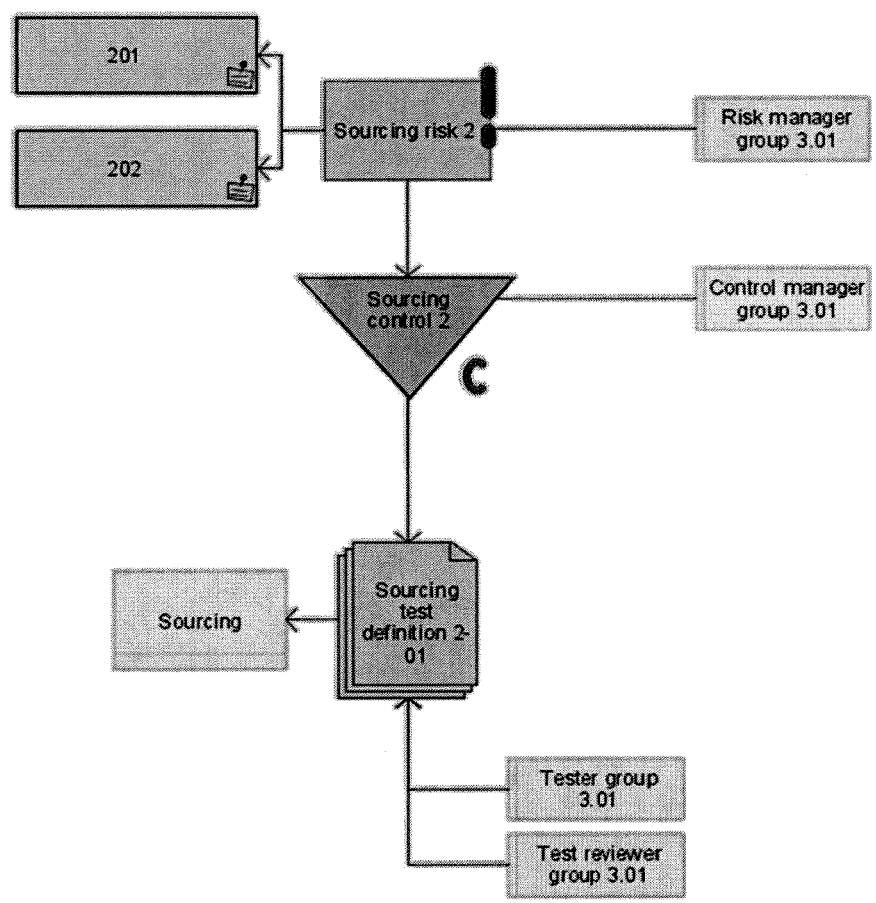
Figure 4:
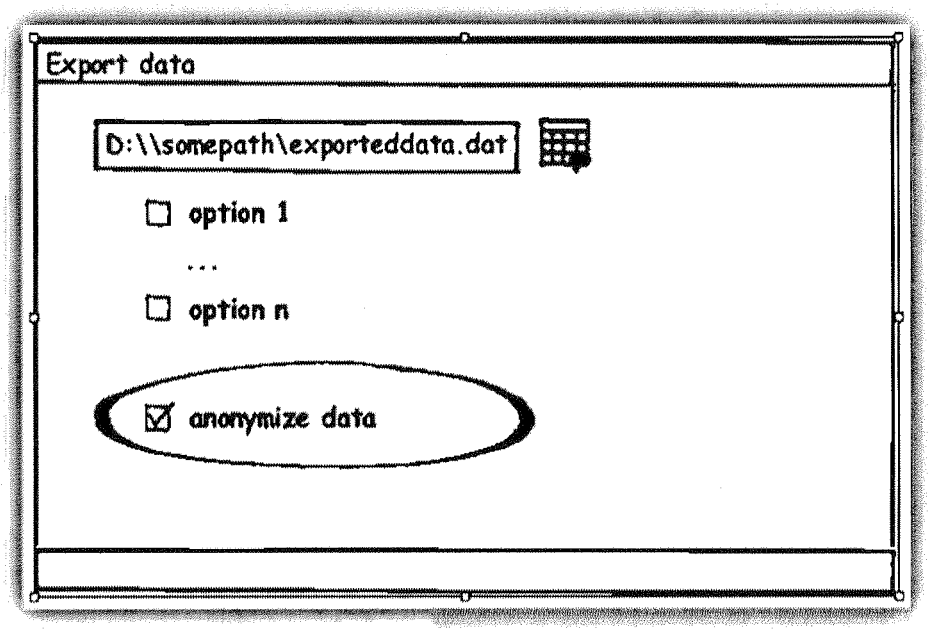
Figure 5:
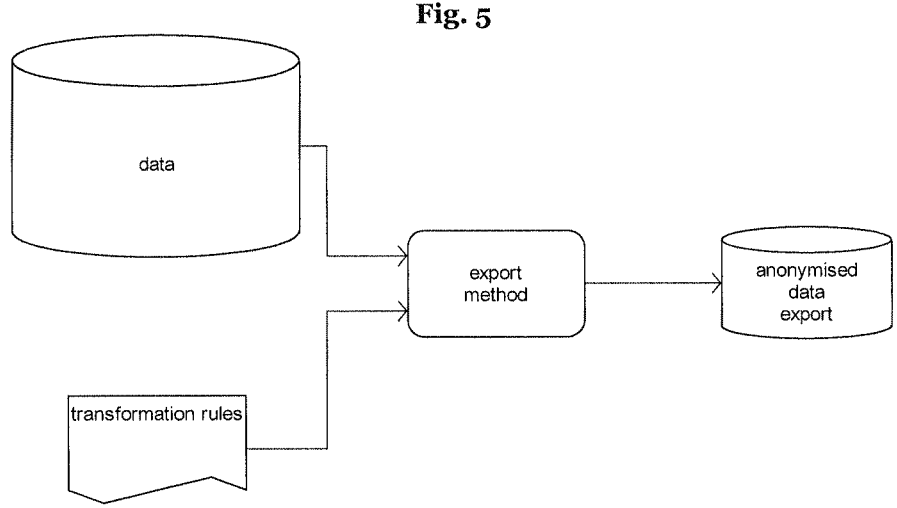

In the following detailed description, presently preferred embodiments of the invention are further described with reference to the following figures:

FIG. 1: A schematic view of a system in accordance with an embodiment of the present invention;

FIG. 2: A flow chart depicting a method in accordance with an embodiment of the present invention;

FIG. 3a: An exemplary Business controls diagram representing data to be anonymized in accordance with an embodiment of the present invention;

FIGS. 3b-e: Exemplary attributes of the objects in the diagram of FIG. 3a;

FIG. 4: An exemplary graphical user interface in accordance with an embodiment of the present invention;

FIG. 5: A schematic view of an anonymizing process using transformation rules in accordance with an embodiment of the present invention;

FIG. 6a: An example for implementing transformation rules as code annotations in accordance with an embodiment of the present invention;

FIG. 6b: An example for implementing transformation rules in a configuration file in accordance with an embodiment of the present invention; and FIG. 7: An example of applying transformations rules to an object in accordance with an embodiment of the present invention.

4. DETAILED DESCRIPTION

In the following, a presently preferred embodiment of the invention is described in the context of a user (hereinafter also called "customer") running a software product provided by a software provider (hereinafter also called "vendor"). The software product operates on data, which is stored in a database. Within the scope of the present invention, the term "database" refers to any means for storing data in an organized manner, i.e. which may also be a file system. Preferably, however, a database comprises a data storage means and a processing logic adapted for receiving and processing requests and for returning the requested data records from the data storage means. In the present example, the user observes a bug or other issue within the software product and wants to report the issue to the software provider in order for the bug to be fixed. However, the software provider can only reproduce the bug based on the user's data. The present invention provides an advantageous approach for anonymizing the user's data before it is provided to the software provider, thereby securing the data confidentiality for the user, but still providing enough information to the software provider to inspect the issue in a meaningful manner. As will be apparent, the concepts underlying the present invention may also be used in other scenarios and are not limited to the described use case of bug reporting.

FIG. 1 shows an architecture of an embodiment of the invention. As can be seen, an exporter component exports at least one data record 10 from a database 2. The data record 10 comprises in this embodiment two data fields 100a and 100b (commonly referred to as data fields or content 100), as well as certain meta-data no. The meta data may contain all information about the entity such as field names, field length, field data types, and also the mapping between field and transformation rule which has to be used for this field. FIG. 1 also shows an anonymization library 4 storing transformation rules 40a, 40b (collectively referred to as transformation rules 40). This emphasizes that the present invention may be used by any application server to anonymize its data entities. The only thing to do is to provide suitable transformation rules 40. FIG. 1 also shows that there is no direct dependency to any proprietary database management system, because the anonymization steps operate only on the data entities built by the application server 1.

As a simple example, it is assumed that the database 2 comprises data records 10 having the following structure (e.g. in a table named "Customer"):

| ID | Name | Given name | Date of birth | ZIP code | City | Street |
|---|---|---|---|---|---|---|
| 1516 | Khin | Gerald | Apr. 27, 1969 | 67227 | Nowhere City | Elm Street 129 |
| 9876 | Doe | John | May 13, 1968 | 66115 | Saarbruecken | Altenkesseler Str. 15 |
| 7777 | Khin | Leonie | Dec. 17, 2012 | 67227 | Nowhere City | Elm Street 129 |

As can be seen, each of the data records 10 (i.e. the rows of the above table) adheres to a predefined structure, in that each data record 10 comprises values for the following data fields 100: ID, Name, Given name, Date of birth, ZIP code, City and Street. The amount, ordering and/or format of the data fields 100 within the data record 10 define the "structure" of the data record 10, while the actual values of the data fields 100 are referred to as "content".

In the above example, an anonymizer component 1 of the inventive system (which may be an integral or separate component with respect to the exporter component) anonymizes at least part of the original contents 100 of the data records 10 in order to produce an anonymized data record 3, e.g. in the form of a document. In the above example, the anonymized data record 3 may look as follows:

```
Id, Name, Given Name, Date of Birth, ZIP Code, City, Street
1254, VCGFRE65432, JKLHF6541W, May 28, 1970, 55111, BCX54DER21, ZX6HDTRWMA
5543, DSAFG7652eR, KLAH9TTRR2, Jun. 14, 1955, 22331, NCXV674RLL, B1563NFGAS
6667, VCGFRE65432, YXC215678Y, Nov. 18, 2011, 55111, BCX54DER21, ZX6HDTRWMA
```

As can be seen, the content 100 of the original data records 10 has been anonymized, i.e. it is not derivable from the anonymized data record 3, but the anonymized data records 3 still have the same structure than the original data records 10. This way, the support team of the software provider is able to investigate the anonymized data in a meaningful manner, since the relationships between the individual data fields are preserved in the anonymized data.

While the above example uses a relational database table for the original data records 10 and a CSV-based file format for the anonymized data records 3, it will be appreciated that the present invention is not limited to these specific formats.

In order to save the structure of the data 10, it is preferred to perform the anonymization in a deterministic manner, i.e. the same input will always lead to the same output. In the above example, this is reflected in that the first and third data record 10 both have the Name "Khin" and thus the first and third anonymized data records 3 also have the same anonymized value "VCGFRE6$_{5432}$". The characteristic of a deterministic anonymization is important because the cause the of issue the customer faces might depend on how many objects have the same special value and might be there in the data (for instance how many people are living in the same special street in the same city, because there might be an issue in the software that occurs only if there are exactly more that $2^{10}$ people living in the same street). One way to achieve such a deterministic and anonymous value is to use a cryptographic hash function, such as an md$_5$ or sha hash, or any other known deterministic hash function.

Alternatively, the present invention may employ random-based value-generators. In this case, the property that the same input will always lead to the same output still has to be ensured. Accordingly, the random-based generators must remember the values they have already used for each input before. In other words, once a certain data field is anonymized in a random fashion for the first time, its anonymized random value is stored in a storage. If later the same data field needs to be anonymized again (e.g. in a different data record), the stored value is used, thus ensuring the deterministic property. For example, transformation rules for ID columns must produce the same values because they are often used in foreign key columns of dependent database tables to reference the parent table.

Typically, the data records to be anonymized comprise data fields having a specific format or data type (e.g. a name type, an email type, a zip code type, and so on). For example, the transformation rules employed in embodiments of the present invention for date values must save the validity for date values, i.e. it is important to provide a range the generated values must not exceed. Ranges are also important for other data columns. It most probably would make no sense to have e.g. customer data with customers having a negative amount of orders or a billion orders. Another example for transformation rules are credit card numbers and email addresses. Here, the format is very important to keep the validity of the anonymized data. Here, values once anonymized also have to be stable if they should be processed a second time. However, the present invention is not limited to a fixed set of transformation rules, but is completely open to plug-in customized transformation rules, allowing it to meet all the business requirements of the software to which the solution might be attached.

In certain embodiments of the present invention, the way how the data is anonymized is configurable. Preferably, the invention will keep the data distribution of the original data repository per default. The transformations are all deterministic (values once anonymized will be stable if they should be processed a second time). This gives the development department the possibility to research issues related to data distribution. However, the danger of actually being able to guess the original data (e.g. a city name out of the amount of persons related to this city) might still exist. Therefore, embodiments of the present invention may offer the possibility to configure some or all data fields to have totally randomized values after the transformation.

In summary, embodiments of the present invention provide some or all of the following characteristics:

- The anonymized data can be imported and checked by the user (customer) itself without implementation knowledge;
- The anonymized data cannot be recovered because the key used by the anonymizing algorithm is randomly created and destroyed after execution;
- The anonymizing configurable. Schema and specific Database Management System knowledge is not necessary;
- The solution is Database Management System independent;
- The solution is Application Server independent;
- The algorithm cannot be modified externally, so granted security cannot be broken by external algorithm changes (e.g. by saving or ignoring temporary encryption key);

The solution is easy to use with only one additional click in the user interface. There has to be no additional export before a separate anonymizing step.

Operation of an Exemplary Embodiment

FIG. 2 is a flow chart depicting steps performed during one embodiment of the method of the present invention. The process starts at step moo when the customer faces a software issue in his software product. Step 1010 comprises analyzing the data protection level in order to decide whether data protection is relevant or not (step 1020). If not (e.g. is the data to be exported does not comprise any confidential information), the method proceeds to step 1060 (see further below). If yes, the method proceeds to step 1030, where the customer selects an anonymizing option provided in an export dialog of the system of the present invention (cf. FIG. 4 for an exemplary screenshot of the export dialog). If the anonymizing option is selected (step 1040), the export to be performed is flagged as "to be anonymized" in step 1050. The person skilled in the art will appreciate that the above steps are only optional preparatory steps serving to initiate the actual exporting function of the present invention, which will be described in the following.

The exporting process starts in step 1060 and proceeds to step 1070, where the first data record 10 (labeled "entity" in FIG. 2) is read from the database 2. If the export to be performed is not flagged as "to be anonymized" (see above) (step 1080) the data record 10 is written "as is", i.e. without any modification to the final exported data 3. Otherwise, one or more transformation rules 40 are executed on the data record 10 to produce a corresponding anonymized data record (see further below for examples), which is then written to the final exported data 3. In step 1110, it is checked whether all data records 10 have been processed. If not, the method iterates again through step 1070, reading the next data record 10, and so on. Finally, the export stream is closed in step 1120.

A Practical Example

In the following example, a GRC Customer uses several business control diagrams of a business process modeling software product to visualize individual risks occurring inside the company. The abbreviation GRC refers to Governance, Risk Management, and Compliance. This umbrella term designates an organization's approach across these three areas. Being closely related concerns, governance, risk and compliance activities are increasingly being integrated and aligned to some extent in order to avoid conflicts, wasteful overlaps and gaps. While interpreted differently in various organizations, GRC typically encompasses activities such as corporate governance, enterprise risk management (ERM) and corporate compliance with applicable laws and regulations.

The customer will also maintain attributes at risk, control and test definition objects containing values relevant for data protection. An exemplary business controls diagram is shown in FIG. 3a. As can be seen, the business control diagram comprises various objects, such the "Risk" object named "Sourcing risk 2", the "Control" object named "Sourcing control 2", the "Test Definition" object named "Sourcing test definition 2-01" and the "Organizational Unit" object named "Sourcing".

Each of the above-mentioned objects has various attributes, which are exemplarily shown in FIGS. 3b-3e. As can be seen, some attributes are rather uncritical, such as "last change" or "time of generation", while others are comprise highly confidential content, which has to be anonymized before the data is transferred to an entity outside of the company. Otherwise, if the above information stored in the objects was revealed freely, the receiving entity could derive exactly which risks are relevant for which organizational units inside the company. The receiving entity could also observe which tests will be applied to cover these risks and which employees are responsible. GRC also offer the possibility to quantify total amounts of losses which will cause damage to the company if the risk ever will occur. All this information has to be kept inside the company and would be a risk for itself if this information would be lost.

Therefore, with the help of the present invention, the customer is going to protect the data and anonymize the fields using certain predefined rules: The Customer will take the original data set and modify it according the local law and individual requirements.

In the following, exemplary transformation rules are presented and various exemplary transformations in accordance with these rules are shown in the following tables:

Transformation of Risk Object:

| field name | original | anonymized | Transformation description |
|---|---|---|---|
| Name | Sourcing risk 2 | Risk 54 | Take object type and concatenate incremented number |
| Description | Sourcing requests can get lost. Purchase orders are not entered in the system. Inaccurate, incomplete information. | Futghnr kethnst jth ent itfh. Tzesnfth ioleht wdt ktv ztnfvst it knz wtumin. Zktwenthvt, lnthrwyvbf ukthunwfkp. | take number of characters and generate equal amount of random text |
| Author | | | Empty -> no change |
| Type | Risk | Risk | no change to structural information |
| Time of generation | Sep 10, 2005 4:23:58 PM | Sep 10, 2005 4:23:58 PM | no transformation rule available -> take original |
| Creator | system | User 15 | Take user and find already generated user with the same source name. Of no mapping exists, generate new name with prefix "User" and incremented number. Reuse this user for other objects and fields with the same source user (see field: "Last user") or the following OrgUnit Object |
| Last change | Mar 22, 2010 3:45:30 PM | Mar 22, 2010 3:45:30 PM | no transformation rule available -> take original |
| Last user | system | User 15 | Take user and find already generated user with the same source name. Of not mapping exists, generate new name with prefix "User" and incremented number. Reuse this user for other objects and fields with the same source user |

Transformation of Control Object:

| field name | original | anonymized | Transformation description |
|---|---|---|---|
| Control ID | K-B2 | Control 38 | Take object type and concatenate incremented number |
| Control objective | Adequate and proper input of purchase orders and their timely processing. | doenfuev ndr dneigz enfit de dneofhtn ypenvu dnr qpcne wnforn woxmerufht. | take number of characters and generate equal amount of random text |
| Key control | true | true | no change to Boolean values |
| Control activity | Check of consecutive, system-side numbering of the purchase orders. | Jherz hj pougnktdbyc, rughsn-gzhn oghtjaxcy cf lgz htgfaqmf ightnd. | take number of characters and generate equal amount of random text |
| Control frequency | Weekly | Weekly | no change to internal enumeration |
| Effect of control | Preventive | Preventive | no change to internal enumeration |

Transformation of Test Definition Object:

| field name | original | anonymized | Transformation description |
|---|---|---|---|
| Test activity | Check compliance with accounting principles. Review the list of long-term open positions. | Fepsk jsjgöpzsng usth iendthzabg itzhgsetfb. Wrdsluj hsr ijt rt tgfr-geen urtg twgcnloac. | take number of characters and generate equal amount of random text |
| Test size | 3% of all purchase requisitions | 3% of all purchase requisitions | no transformation rule available -> take original |
| Test frequency | Monthly | Monthly | no change to internal enumeration |
| Time limit for execution in days | 20 | 20 | no transformation rule available -> take original |
| Start date of test definition | Nov. 18, 2005 | Nov. 18, 2005 | no transformation rule available -> take original |
| Start date of test definition | Dec. 31, 2010 | Dec. 31, 2010 | no transformation rule available -> take original |
| Length of control period | Month | Month | no change to internal enumeration |
| Offset in days | 18 | 18 | no transformation rule available -> take original |
| Follow-up allowed | yes | yes | no change to Boolean values |

Transformation of OrgUnit:

| field name | original | anonymized | Transformation description |
|---|---|---|---|
| Name | Sourcing | OrgUnit 22 | Take object type and concatenate incremented number |
| Identifier | | | no transformation rule available -> take original |
| Author | | | no transformation rule available -> take original |
| Type | Organizational unit | Organizational unit | no change to internal enumeration |
| Time of generation | Oct 24, 2005 6:46:47 PM | Oct 24, 2005 6:46:47 PM | no transformation rule available -> take original |
| Creator | system | User 15 | Take user and find already generated user with the same source name. Of not mapping exists, generate new name with prefix "User" and incremented number. Reuse this user for other objects and fields with the same source user |
| Last change | Mar 22, 2010 3:45:19 PM | Mar 22, 2010 3:45:19 PM | no transformation rule available -> take original |
| Last User | system | User 15 | Take user and find already generated user with the same source name. Of not mapping exists, generate new name with prefix "User" and incremented number. Reuse this user for other objects and fields with the same source user |

It is noted that the exemplary transformation rules 40 shown in the above tables are not limited to the specific example described herein. Instead, each transformation rule 40 disclosed herein may be used on its own in any application scenario of the present invention.

Due to the fact that relations between objects will be kept and all system relevant fields, such as object ids, giuds or enumerations stay untouched, the application will run consistently good. The performance will also be the same because the amount of data is equal.

Now the information inside the exemplary BCD (Business Control Diagram) of FIG. 3a is anonymized, as represented by the anonymized column in the above tables. All information about internal company risks, activities and responsibilities are completely transformed, but the original data characteristic (i.e. the structure and relationships of the data) is still available.

Let us assume that the customer has the following technical issue: Due to an internal bug, the creator of Objects with type RISK is not able to edit these objects after initial saving. Also the related Control Object cannot be edited by the creator of the assigned risk object.

The cause of this technical issue is that a customized internal rule does not contain an edit right for risk creators anymore. This was overseen during the customizing process.

With the data anonymized as explained above, the technical expert can analyze the issue and help the customer without contact to its internal secret information. This is possible because the assignment between risk and creator user is still valid. The expert will search an object with the technical type "RISK" and has a look for the assigned user (in the above example "User 15"). He will log in into the system with this "User 15" and analyze the issue without knowing anything about the original data.

Exemplary Implementation Aspects

As already mentioned before, embodiments of the invention provide a graphical user interface (GUI), which—besides the common options for data exporting purposes—comprises a new check box element where the user can choose the anonymization of his export data feature with a single check action (cf. FIG. 4).

The export method then takes the data from a data source (for instance a DBMS) 2 and a set of transformation rules 40 (e.g. provided as a configuration file) and applies the transformation rules to the data 10. The output is the export 3 containing the data in anonymized form, thereby obeying the validation criteria as defined in the transformation rules 40 (cf. FIG. 1 and also FIG. 5).

The transformation rules may be implemented in various ways. For example, if a programming language is used that supports annotations, then one may introduce annotations to specify the constraints for the fields of the classes in the object model by annotating these fields. Thus, the transformation rules 40 might be compiled into the code, as exemplarily shown in FIG. 6a.

Alternatively or additionally, the transformation rules 40 could as well be provided as a configuration file (e.g. an XML file) that the application would have to read in (the file could be part of the deployment unit, a jar file for instance), as exemplarily shown in FIG. 6b.

Each transformation rule 40 is preferably associated with a specific implementation class where the transformation step is implemented. For example, consider an IntegerTransformer class to transform an integer value while satisfying the additional constraints you can pass as optional parameters (such as min or max). Or consider domain-specific transformer classes like EmailTransformer or CreditCardNumberTransformer to generate email values or valid credit card numbers for instance. Preferably, there is a central Transformer class with a routine that takes an object as input and produces a transformed object as output after having applied the specific transformer implementation classes for all the annotated fields of the object, as exemplarily shown in FIG. 7.

As already described, it is important to keep determinism while anonymizing the data, so that the same values from the original data source are transformed to the same anonymized values each time they are transformed. This is because the application might rely on redundancies, so that the transformation algorithm must reflect this property. One way to achieve determinism is to use a deterministic function where it is applicable. This function has to ensure that for fields to be encrypted always the same result are obtained for the same input. Therefore, certain embodiments will key the encryption key during execution and destroy it before finishing. Other fields which have to keep semantic (e.g.: Number range or sign fields) will be anonymized by a deterministic algorithm. The more general approach is to remember the transformed value for each given original value. For the latter approach, embodiments of the invention may use a cache storing the (original-value, transformed-value) pairs. Because this might be very expensive in terms of main memory, an eviction strategy may be chosen for the cache to spill the evicted pairs out to a temporary persistent store.

In view of the various aspects of the present invention disclosed herein, the proposed method and system differs from the prior art mentioned further above at least in the following aspects:

Oracle's Data-Pump enabling the customer to plug-in a self-written function to modify the data (Data Pump Data Remapping) has the following disadvantages: the solution is not database system independent, the way how the data should be modified must be hard-coded in a self-written function and relies on the user's database schema (i.e. it is not generic), from the application point of view data consistency will not be kept, due to the fact that there is PLSQL code necessary the user has to have special skills to create and to modify this code, extended functions are not integrated into the application itself, so there is an additional step necessary and of course higher skills to execute this Oracle administrative tool.

ARTS business architect of applicant provides a report (internal java script functions based on public API) to make the data anonymous. However, the following disadvantages might occur: underlying original data will be modified by the report, so a copy of data has to be made beforehand, the solution is bound to the ARTS data model and it is hard-coded in the report code (i.e. not configurable), here we have a dependency to the internal script language and the used API (application programming interface), there is an additional step necessary to be executed before anonymous data export, the report has no context, so it is not possible to process complex requirements like references over text field values, higher skills necessary create and to modify this code (i.e. it is not configurable), it cannot be reused for other products.

Another example of the prior art described further above is transforming already exported data, e.g. as XML file, with the help of XSLT transformations. However, this approach takes place after the export is done, it will raise security issues again and has to be implemented against a proprietary xml scheme, so no generic solution is possible, this solution is also not user-friendly because of the additional export step, and higher skills are necessary to create and to modify the XSLT transformation.

Exemplary Use Cases

In the following, an exemplary operation of embodiments of the present invention is explained in the context of the following use cases:

Use Case 1: In order to reproduce bugs or performance issues, customers report to their vendor's support department. It is often necessary to operate on the customer's data because the issue to be reproduced highly depends on the structure and validity of the customer's data. That said, customers are often not willing to send their data to the vendor's support department. Making the data anonymous while exporting the data gives the customer the possibility to submit their data without the danger of actually disclosing it. The customer can produce the export directly as an option when starting the export functionality. He does not have to copy his data and making it anonymous before doing the export, but as an integral part of the export functionality, as an option. By making the solution configurable, by providing a system of rules and by enabling specification of validators, the solution obeys the rules of the application to save the consistency and validity of the data. The solution comes with a stable interface so that it can be used in different products. It is independent from a specific DBMS the application might use. The solution is also encapsulating the algorithm for anonymizing the data, so this algorithm cannot be modified externally and so it is guaranteed that the export can be imported inside the vendors R&D department. The solution uses a one way encryption which cannot be decrypted inside the vendors R&D department, thus the customer avoids the danger of disclosing the data.

Use Case 2: It is assumed that a software vendor has a customer which is a bank and maintains account data with the software. This customer faces an issue with the software that depends on the state of his data, not the actual values themselves but on the relationships between the data entities, i.e. the structure of the data. Because of data protection rules, sometimes enforced by law, the customer might be not willing or not entitled to send his data to the vendor, so the vendor is not able to reproduce the issue within the software product. With the present invention, the customer has the possibility to produce an anonymized data export with one click, so that the exported data has still the original structure and validity but cannot be recovered by anyone. This anonymized data export gives the vendor the possibility to reproduce the reported issue inside his development department.

Use Case 3: In complex software environments, where different software components interact in a complex manner so that it is not possible to mimic the customer's scenario with reasonable efforts from the support organization of the software vendor, in order to analyze eventually the software issue the customer reported, or just because the software might be heavy customized (as for instance in case of enterprise resource planning software installations) and is supposed to run properly merely in the customer's environment, it is possibly more reasonable to replicate the data from the customer's productive system to his test system where it can be subject to be analyzed in isolation and without disturbing the productive system. The data in the test system can be made anonymous during replication, and data that references some data in external systems (such as hyperlinks, IP-addresses, file-system shares) can be adapted to refer to other addresses available in the test system.

Use Case 4: Another scenario is that of collecting statistical information. For instance, a company having subsidiaries all across the world intends to analyze the performance of the processes that are executed in each subsidiary without violating national laws regarding data privacy protection or without disobeying codetermination rules by the work councils. Further, it is desired to collect certain key performance indicators (e.g. throughput times or number and kind of used application systems and such on), without having information about involved persons inside the data. Thus, it would make sense to anonymize the data where the information requiring protection is anonymized and the data that will be subject to become analyzed would be kept unanonymized.

In summary, embodiments of the present invention propose a selective data anonymizing mechanism, in particular for communicating with a support unit. The user communicating with the support unit selects the data fields that should be anonymized, but in doing so the relations between the different fields are maintained. This allows the support unit to analyze a process for bugs that occur with certain data structures, without having access to sensitive/confidential data. Discreet transformations are used to ensure that the transformed data remains consistent. A random encryption key is generated to anonymize data and it is destroyed once the data has been anonymized to ensure that it cannot be recovered.

It will be appreciated that as used herein, the terms system, subsystem, service, module, program logic, programmed logic circuitry, and the like may be implemented as any suitable combination of software, hardware, firmware, and/or the like. These system may include, for example, processing resources such as, for example, at least one processor and a memory, that may at least partially control software and/or other modules, etc. It also will be appreciated that the storage locations/repositories herein may be any suitable combination of disk drive devices, memory locations, solid state drives, CD-ROMs, DVDs, tape backups, storage area network (SAN) systems, and/or any other appropriate non-transitory tangible computer readable storage medium. For instance, data may be exported to a non-transitory computer readable storage medium. It also will be appreciated that the techniques described herein may be accomplished by having at least one processor execute instructions that may be tangibly stored on a non-transitory computer readable storage medium. Similar statements apply with respect to clients, servers, and/or other elements in various network arrangements.

What is claimed is:

1. A computer-implemented method of anonymizing data of a database, the database including a plurality of data records, with each one of the plurality of data records including a plurality of content elements, each one of the plurality of data records adhering to a first defined structural relationship based on the plurality of content elements, the method comprising:
   anonymizing, in connection with at least one processor, at least one of the plurality of content elements for each one of the plurality of data records to produce at least one corresponding anonymized content element; and
   exporting, in connection with the anonymizing, the plurality of data records,
   wherein each one of the plurality of exported data records includes the at least one corresponding anonymized content element instead of the at least one of the plurality of content elements,
   wherein each one of the exported plurality of data records adheres to a second defined structural relationship, and
   preserving, in connection with the anonymizing, the structural relationship between the content elements for each one of the plurality of data records through the anonymization of at least one of the plurality of content elements for each one of the plurality of data records such that the first defined structural relationship of the plurality of content elements prior to anoymization is equal to the second defined structural relationship,
   generating a random encryption key; and
   deleting the random encryption key in connection with completion of anonymization of the at least one of the plurality of content elements,
   wherein the at least one corresponding anonymized content element is anonymized with the random encryption key.

2. The method of claim 1, wherein the anonymizing is performed during the exporting, so that no confidential content is stored outside of the database during the exporting process.

3. The method of claim 1, further comprising selecting the at least one of the plurality of content elements for each one of the plurality of data records that are to be anonymized.

4. The method of claim 1, wherein the anonymizing is performed in a deterministic manner.

5. The method of claim 4, wherein the anonymizing is performed using a cryptographic hash function.

6. The method of claim 5, wherein the cryptographic hash function is the Message-Digest Algorithm 5 (MD5) and/or the Secure Hash Algorithm (SHA).

7. The method of claim 4, wherein the anonymizing is performed using a random anonymizing process and using a cache to remember already created anonymized content.

8. The method of claim 1, wherein the content to be anonymized adheres to at least one data type and wherein the anonymizing preserves the validity of the anonymized content in accordance with the at least one data type.

9. The method of claim 1, wherein the anonymizing is performed using one or more predefined transformation rules.

10. The method of claim 9, wherein the one or more predefined transformation rules are provided as code annotations and/or as a configuration file.

11. The method of claim 10, wherein the one or more predefined transformation rules are provided as an XML file.

12. The method of claim 1, wherein the at least one of the plurality of content elements for each one of the plurality of data records comprises confidential data and wherein the corresponding anonymized data record is usable for being investigated while preserving the confidentiality of the confidential data.

13. A system for anonymizing data of a database, the database including a plurality of data records, with each one of the plurality of data records includes a content element, the system comprising:
   processing resources including at least one processor and a memory, the at least one processor being configured to control a plurality of computer-related components including:
      an exporter component configured to export the plurality of data records at least one data record from the database along with the included content element for each one of the plurality of data record;
      an anonymizer component configured to anonymize the content element for each one of the plurality of data records to produce a corresponding anonymized content element such that the content element for each one of the plurality of data records and the corresponding anonymized content element for each one of the data records is consistent in size and/or an amount of content; and
      an encryption key component configured to generate a random encryption key and delete the random encryption key in connection with completion of the anonymization the content element for each one of the plurality of data records,
   wherein the anonymizer component is further configured to anonymize the content elemrnt for each one of the plurality of data records in accordance with the generated random encryption key.

14. The system of claim 13, wherein the content element for each one of the plurality of data records adheres to a data type and wherein the anonymizer component is configured to preserve the validity of the corresponding anonymized content element in accordance with the data type.

15. The system of claim 13, further comprising a transformation rule library configured to store one or more predefined transformation rules to be used by the anonymizer component.

16. The system of claim 13, further comprising a graphical user interface configured to enable a user to select content element to be anonymized, wherein the anonymizer component is configured to anonymize only the selected content.

17. A non-transitory computer-readable storage medium tangibly storing instructions for use with a database system, the database system including a with a plurality of data records, with each one of the plurality of data records including a plurality of content elements, each one of the plurality of data records adhering to a first defined structural relationship based on the plurality of content elements, the stored instructions comprising instructions that, when executed by at least one processor of a computer system, are configured to:
   anonymize at least one of the plurality of content elements for each one of the plurality of data records to produce at least one corresponding part of the content to produce at least one anonymized content element data record; and
   export, in connection with the anonymizing, the plurality of data records,
   wherein each one of the plurality of exported data records includes the at least one corresponding anonymized content element instead of the at least one of the plurality of content elements,
   wherein each one of the exported plurality of data records adheres to a second defined structural relationship, and
   preserve, in connection with the anonymizing, the structural relationship between the content elements for each one of the plurality of data records through the anonymization of at least one of the plurality of content elements for each one of the plurality of data records such that the first defined structural relationship of the plurality of content elements prior to anonymization is equal to the second defined structural relationship,
   wherein the anonymizing is performed using a deterministic function such that successive anonymization of the same content will result in the same anonymized content.

18. The non-transitory computer-readable storage medium of claim 17, wherein the stored instructions comprise further instructions that, when executed by at least one processor of a computer system, are configured to:
   load, from a storage medium, at least one previously defined transformation rule,
   wherein the anonymization of the at least one of the plurality of content elements for each one of the plurality of data records is carried out according to the loaded at least one previously defined transformation rule.

19. The non-transitory computer-readable storage medium of claim 18, wherein the at least one of the plurality of content elements for each one of the plurality of data records is equal in size and/or amount of content to the corresponding anonymized content element included in the exported plurality of data records.

* * * * *

UNITED STATES PATENT AND TRADEMARK OFFICE
CERTIFICATE OF CORRECTION

PATENT NO. : 8,949,209 B2
APPLICATION NO. : 13/479775
DATED : February 3, 2015
INVENTOR(S) : Khin et al.

It is certified that error appears in the above-identified patent and that said Letters Patent is hereby corrected as shown below:

In the Specification

Column 1, line 36, change "Another example is the product ARTS business" to

--Another example is the product ARIS business--

Column 1, line 39, change "the data of a user's ARTS installation anonymous." to --the data of a user's ARIS installation anonymous.--

Column 5, line 55, change "value "VCGFRE6$_{5432}$". The characteristic of a" to --value "VCGFRE65432". The characteristic of a--

Column 5, line 64, change "hash function, such as an md$_5$ or sha hash, or any other known" to --hash function, such as an md5 or sha hash, or any other known--

Column 6, line 60, change "The anonymizing configurable. Schema and specific" to --The anonymizing configurable schema and specific--

Column 7, line 7, change "process starts at step moo when the customer faces a software" to --process starts at step 1000 when the customer faces a software--

Column 12, line 20, change "ARTS business architect of applicant provides a report" to --ARIS business architect of applicant provides a report--

Column 12, line 25, change "solution is bound to the ARTS data model and it is hard-coded" to --solution is bound to the ARIS data model and it is hard-coded--

Signed and Sealed this
Seventh Day of July, 2015

Michelle K. Lee
*Director of the United States Patent and Trademark Office*

In the Claims

Column 15, line 44, Claim 13, change "to anonymize the content elemrnt for each one of the" to --to anonymize the content element for each one of the--